United States Patent [19]

Bourgeois

[11] 4,262,794

[45] Apr. 21, 1981

[54] CONVEYOR ACCELERATOR SYSTEM

[76] Inventor: Ronald D. Bourgeois, 38 Ellison Park, Waltham, Mass. 02154

[21] Appl. No.: 34,585

[22] Filed: Apr. 30, 1979

[51] Int. Cl.³ .......................................... B65G 47/28
[52] U.S. Cl. ..................................... 198/459; 198/779
[58] Field of Search .............. 198/459, 779, 460, 434, 198/859

[56] References Cited
U.S. PATENT DOCUMENTS

| | | | |
|---|---|---|---|
| 1,677,656 | 7/1928 | Roberts et al. | 198/779 X |
| 2,959,273 | 11/1960 | Sykes | 198/779 |
| 4,003,466 | 1/1977 | Muth et al. | 198/459 X |

*Primary Examiner*—Robert B. Reeves
*Assistant Examiner*—Douglas D. Watts
*Attorney, Agent, or Firm*—Joseph S. Iandiorio

[57] ABSTRACT

Conveyor apparatus includes a main roller conveyor including a plurality of linked, independently rotatable rollers; and a roller accelerator system including an accelerator drive disposed proximate the roller conveyor; and actuator means for moving the accelerator drive into driving contact with the rollers of the main conveyor to vary the peripheral speed of the surface of the rollers relative to the speed of the main conveyor.

1 Claim, 7 Drawing Figures

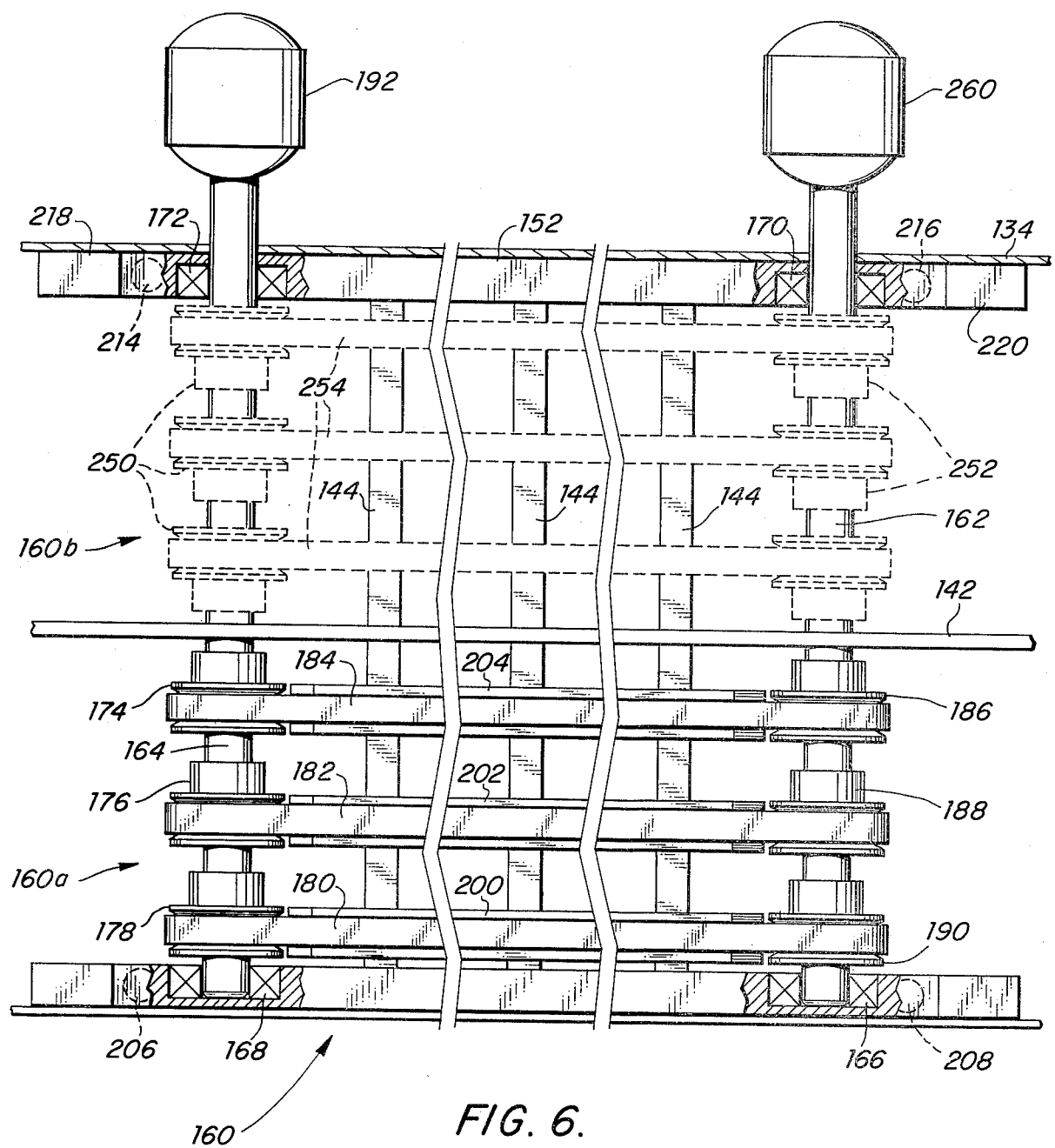
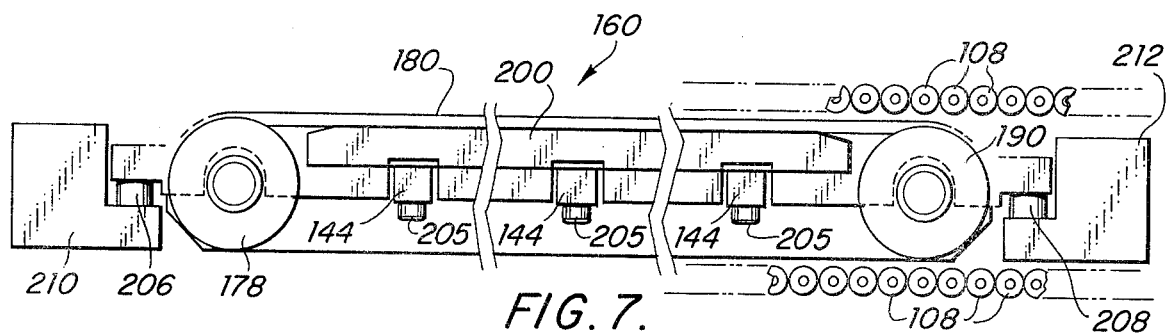
FIG. 6.
FIG. 7.

CONVEYOR ACCELERATOR SYSTEM

FIELD OF INVENTION

This invention relates to an accelerator system for varying the velocity and direction of motion of products carried by a conveyor relative to the velocity and direction of motion of the conveyor.

BACKGROUND OF INVENTION

It is often desirable to reduce the speed of products carried by a conveyor in a certain area of the conveyor without changing the speed of objects on the remainder of the conveyor or changing the speed of the conveyor itself. Such control of the speed of the objects conveyed is useful when it is desirable to achieve, e.g., an orderly merging of two or more lines of objects into a single line; a uniform decrease or increase in spacing in objects in a single line; rotation of objects on the conveyor; holding or stalling of the objects. Previously it has been suggested that a friction plate be brought in contact with the bottoms of rollers linked together in a moving belt in order to cause the roller to rotate and move the objects forward faster on the belt. Such a technique can only speed up the forward speed of the objects relative to the moving belt: it can not slow down, halt, or reverse their direction. Further, the increase in speed is not controllable but fixed by the speed of the conveyor and diameter of the rollers.

SUMMARY OF INVENTION

It is therefore an object of this invention to provide an improved device for controlling the speed and direction of objects carried by a conveyor independent of the speed and direction of the conveyor.

It is a further object of this invention to provide such an improved device which can move objects in a direction opposite to that of the conveyor and can halt or hold objects stationary relative to the moving conveyor.

The invention features conveyor apparatus including a main roller conveyor with a plurality of linked, independently rotatable rollers and a roller accelerator system. The roller accelerator system includes an accelerator drive disposed proximate the roller conveyor and actuator means for moving the accelerator drive into driving contact with the rollers of the main conveyor. When in contact with the rollers of the main conveyor the accelerator drive rotates each of the independent rollers to vary the peripheral speed of the surface of the rollers relative to the speed of the main conveyor, and thereby vary the speed and/or direction of motion of objects carried by the conveyor.

In a preferred embodiment the accelerator drive includes drive belt means and the drive belt means may include one or a plurality of separate belts. The main conveyor may include two or more sets of independently rotatable rollers, and the roller accelerator system may be disposed proximate only one of the sets or both of the sets. Alternatively, the accelerator drive may include two or more sections, one proximate each of the sets of rollers in the main conveyor.

The accelerator drive further may include first and second drive shafts: the first section may include first drive means fixed to the first shaft, second drive means rotatable on the second shaft, and first drive belt means mounted on the first and second drive means. The second section may include third drive means rotatable on the first shaft, fourth drive means fixed on the second shaft, and second drive belt means mounted on the third and fourth drive means.

DISCLOSURE OF PREFERRED EMBODIMENT

Other objects, features and advantages will occur from the following description of a preferred embodiment and the accompanying drawings, in which:

FIG. 6 is a plan view of the apparatus of FIG. 5; and

FIG. 7 is a side elevational view of the apparatus of FIG. 5.

The invention may be accomplished with a conveyor apparatus including a main roller conveyor, with a plurality of linked independently rotatable rollers and a roller accelerator system. The roller accelerator system includes an accelerator drive located proximate the main conveyor, typically beneath it. There are actuator means for moving the accelerator drive into driving contact with the rollers of the main conveyor to vary the peripheral speed for the surface of the rollers relative to the speed of the main conveyor.

The main conveyor may be a plurality of low-friction rollers rotatably mounted on steel rods which are linked at either end to neighboring rollers to form chainlike structures at each edge of the belt which engage with sprockets, at least one of which is fixed to a drive shaft connected to a motor. The accelerator system typically includes a pair of spaced shafts upon which are mounted pulleys which carry a belt or belts. One of the pulleys is fixed to one of the shafts, which is driven by a motor. When this belt is driven in the same direction as the main conveyor it causes the rollers to rotate so that their upper conveying surface is moving backward relative to the direction of the main conveyor belt. The speed of these pulleys, and thus the belt which they carry, may be varied in order to vary the relative speed between the upper surface of the rollers and the main conveyor so that objects carried thereby can be made to stand still or move in the opposite direction to that of the main conveyor. If the pulleys and belt are made to move in a direction opposite that of the main conveyor, then the upper surfaces of the rollers will move in the same direction as the main conveyor and objects thereon will be moved forward in the direction of the main conveyor with increased speed.

The accelerator system also includes actuator means for selectively moving the accelerator drive into and out of contact with the main roller conveyor.

The main conveyor may include more than one set of rollers, for example two sets in side by side relationship; and there may be an accelerator drive associated with only one or with both of the sections.

The accelerator drive may include one or more belts, with a corresponding number of pulleys on each shaft.

The accelerator drive may include two sections; for example, one associated with each set of a two-set main conveyor. In that case one of the two groups of pulleys associated with the belt or belts in one section may be fixed to one of the shafts, while the other group of pulleys is rotatable on the other shaft. In the other section, one group of pulleys is fixed to the other shaft while the second group of pulleys is rotatable on the first shaft. In this way, only two shafts are necessary to drive all the pulleys and each shaft controls only one of the sections so that each of the sections can be controlled independently as to speed and direction.

Figure 1:
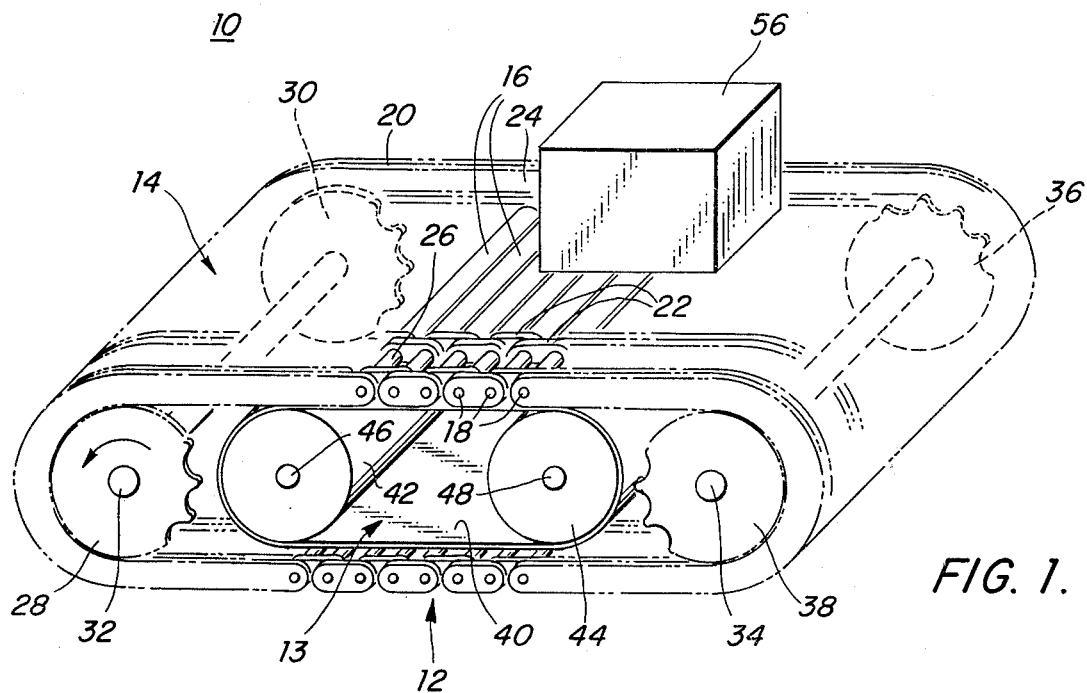
FIG. 1 is a simplified diagrammatic axonometric view of an accelerator system disposed in a conveyor apparatus according to this invention.

There is shown in FIG. 1 a conveyor apparatus including an accelerator system 12 in accordance with this invention. Conveyor apparatus 10 includes a main conveyor 14 formed of a plurality of low-friction rollers 16 made of a low-friction material, for example Delran or Teflon, mounted on pins 18 which are linked together at either end by links 20, 22. There are reduced sections 24, 26 at each end of rollers 16 which engage with the teeth on sprockets 28 and 30, mounted on shaft 32, and sprockets 34 and 36 mounted on shaft 38. Shaft 32 is driven by a suitable prime mover such as an electric motor. Accelerator system 12 includes typically some sort of accelerator drive 13 such as belt 40, driven by rollers or pulleys 42, 44, mounted on shafts 46, 48, one of which is driven to move belt 40.

Figure 2:
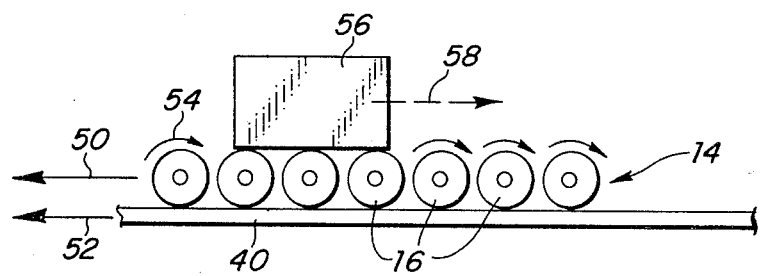
FIG. 2 is a simplified diagram of the relative motions of the main conveyor, accelerator drive, and individual roller rotation and resultant motion of the conveyed object.

In operation, if belt 14 is driven to the left as shown by arrow 50, FIG. 2, and belt 40 is also driven to the left, arrow 52, at a higher speed in contact with rollers 16, then rollers 16 are rotated in a clockwise direction as shown by arrows 54, and the conveyed object 56 has a resultant velocity in the opposite direction as shown by arrow 58. By adjusting the speed of belt 40 with respect to that of belt 14, objects 56 may be made to move quickly or slowly in the direction of arrow 58; or, if belt 40 is moved in the opposite direction then objects 56 are moved in the same direction as arrow 50.

Figure 3:
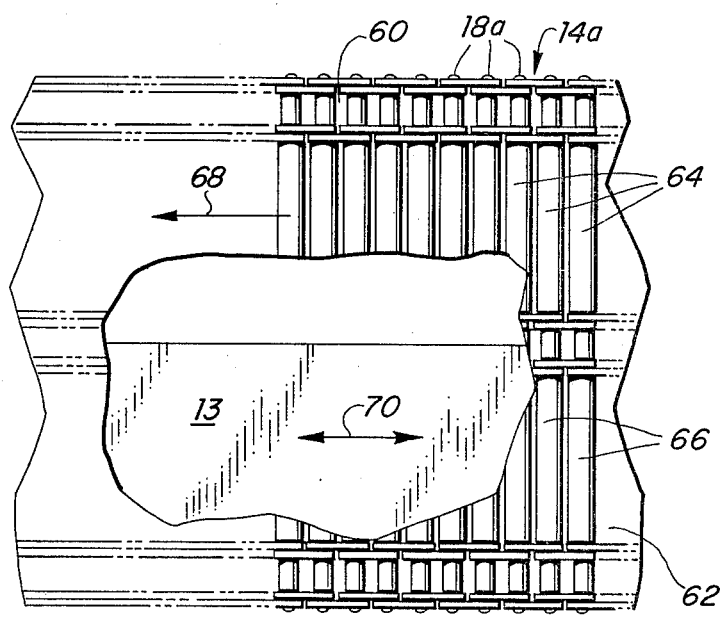
FIG 3 is a diagrammatic plan view of a conveyor apparatus with an accelerator drive associated with only one part of the conveyor.

Main conveyor 14a, FIG. 3, may include two parts 60, 62, each of which includes a separate set of rollers 64, 66, which are independently rotatable on rods 18a. An accelerator drive 13 may be placed beneath only part 62 so that objects on part 60 move in the forward direction, as shown by arrow 68, on main conveyor 14a, while objects on part 62 of main conveyor 14a may be made to stand still or move in either direction as shown by double arrows 70.

Figure 4:
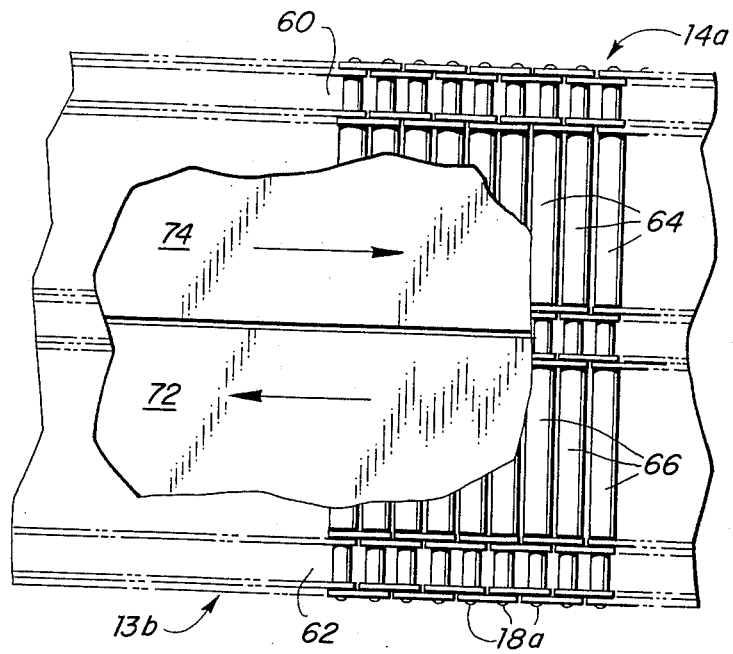
FIG. 4 is a simplified sketch of a conveyor apparatus with a two-section accelerator drive.

Alternatively, accelerator drive 13b, FIG. 4, may include two sections 72, 74, each of which is capable of being driven independently in the same or different directions. When driven in different directions, single objects introduced to bear on both are rotated to the extent of the relative difference in speeds of the two oppositely directed sets of rollers 64 and 66.

Figure 5:
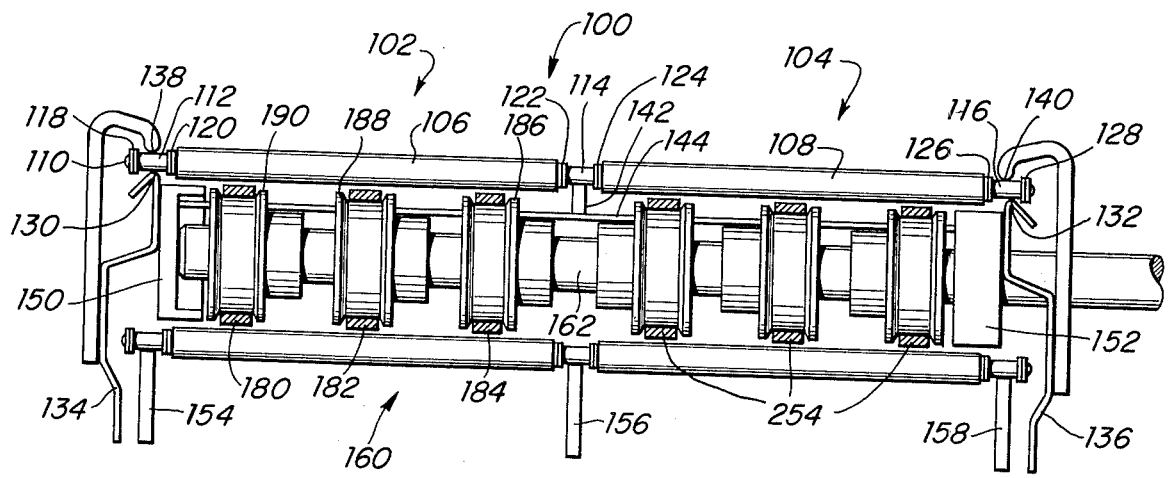
FIG. 5 is a detailed elevational end view of a two-section accelerator drive according to this invention.
Figure 8:
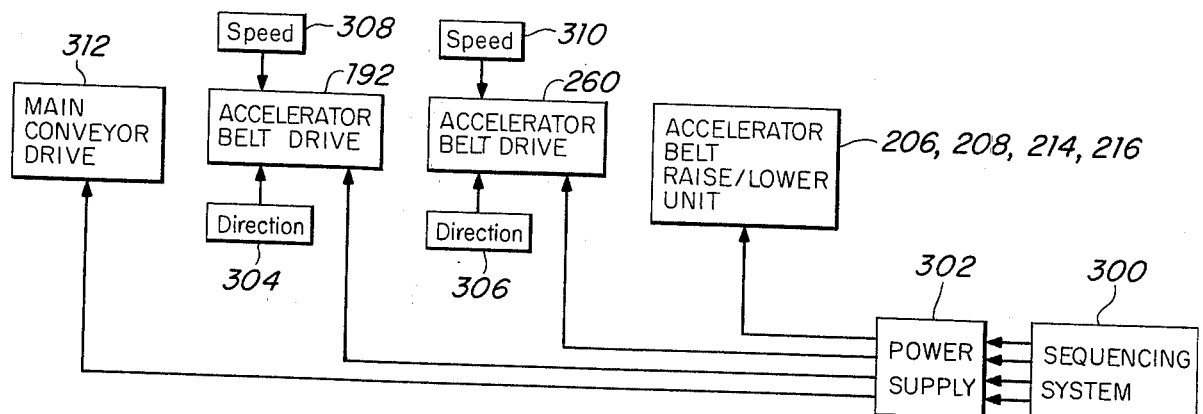

In FIGS. 5, 6, and 7, main conveyor 100 includes two parts 102, 104, formed of rollers 106 and 108. Reduced sections 112, 114 and 116, defined by pairs of links 118, 120, 122, 124, 126, 128, and provided at each end and between rollers 106 and 108. Reduced portions 112 and 116 ride on bearing surfaces 130 and 132 of main frame segments 134, 136. Along the upper run of conveyor 100, reduced sections 112 and 116 are constrained by upper bearing surfaces 138, 140. Central reduced section 114 rides on rail 142 mounted on cross member 144 which is fastened at either end to supports 150, 152. On the lower run of conveyor 100, the reduced sections ride on rails 154, 156, and 158. Accelerator drive 160 includes two shafts 162, 164, carried in bearings 166, 168 in support member 150 and bearings 170 and 172 in support member 152. Mounted on shaft 164 are three pulleys 174, 176, 178, each of which carries a belt 180, 182, and 184, which courses about one of pulleys 186, 188 and 190 either fixed to or rotatable with shaft 162; shaft 164 is the driven shaft powered by motor 192. Belts 180, 182, and 184 are carried in channels 200, 202, 204, supported on cross member 144 by bolts 205. The speed and direction of motion of belts 180, 182, and 184 is controlled by motor 192 through shaft 164 and pulleys 174, 176 and 178. The entire accelerator drive is moveable to and from contact with rollers 106, 108 by some actuator means such as solenoids 206, 208, which are carried by mountings 210 and 212 fixed to main frame member 136, and solenoids 214, 216, carried by mountings 218 and 220 fixed to main frame segment 134. Solenoids 206, 208, 214 and 216 may be actuated to move accelerator drive 160 into or out of contact with main conveyor 100. In addition to section 160a referred to, accelerator drive 160 may include a second section 160b including, for example, three pulleys 252 fixed for rotation with shaft 162 and three belts 254 carried by those pulleys. Shaft 162 can then be extended to be driven by a second motor 160. Then belts 254 have their direction and speed controlled by motor 260 through pulleys 252 which are fixed to shaft 162, while pulleys 250 rotate freely on shaft 164. As previously, belts 180, 182 and 184 have their speed and direction controlled by motor 192 through pulleys 174, 176 and 178 fixed thereto, while pulleys 186, 188 and 190 rotate freely on shaft 162. Control over operation of the conveyor apparatus may be achieved, for example, through a timing or stepping motor or other sequencing system 300, FIG. 8, which selectively actuates power supply 302 to operate the first accelerator belt drive, for example motor 192, and the second accelerator belt drive, for example motor 260, and the accelerator belt raise and lower unit, solenoids 207, 208, 214, and 216, in a predetermined sequence. The direction 304, 306, and speed, 308, 310, controls may be set manually, independently, or by sequencing system 300. The main conveyor drive, such as motor 312, interconnected with shaft 32 or 38, FIG. 1, may also be driven by power supply 302.

Other embodiments will occur to those skilled in the art and are within the following claims:

What is claimed is:

1. Conveyor apparatus comprising a main roller conveyor having first and second sets of first and second rotatable rollers; and a roller accelerator system including an accelerator drive disposed proximate said main conveyor; said accelerator drive including a first section proximate said first set of rollers and a second section proximate said second set of rollers, and first and second drive shafts, said first section including first drive means fixed to said first shaft, second drive means rotatable on said second shaft, and first drive belt means mounted on said first and second drive means; and said second section including third drive means rotatable on said first shaft, fourth drive means fixed to said second shaft, and second drive belt means mounted on said third and fourth drive means; and actuator means for moving said accelerator drive into driving contact with said rollers of said main conveyor to vary the peripheral speed of the surface of said rollers relative to the speed of said main conveyor.

* * * * *